Figure 2:
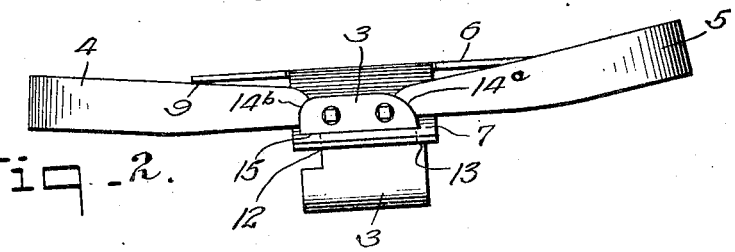

Sept. 27, 1932.  J. U. LEHN ET AL  1,879,939
ANIMAL TRAP
Filed Sept. 10, 1930

INVENTORS
MARY A. HUEBENER
& JOHN U. LEHN
BY
ATTORNEYS

Patented Sept. 27, 1932

1,879,939

UNITED STATES PATENT OFFICE

JOHN U. LEHN AND MARY A. HUEBENER, OF LITITZ, PENNSYLVANIA, ASSIGNORS TO ANIMAL TRAP COMPANY OF AMERICA, OF LITITZ, PENNSYLVANIA, A CORPORATION OF PENNSYLVANIA

ANIMAL TRAP

Application filed September 10, 1930. Serial No. 480,936.

This invention relates to spring actuated animal traps.

It is the main object of the invention to provide an improved form of trap of the above character which will be more sensitive in operation and of simpler and more robust construction than traps hitherto used.

It is a more specific object of the invention to provide a spring actuated trap comprising a base having an upturned end, a pair of jaws, and a bait pan having an aperture through which said end passes, and an extension or ear on said pan adapted to contact with one of the jaws and hold it in the set position.

Further features and objects of the invention will be apparent from the following description taken in conjunction with the accompanying drawing.

Figure 3:
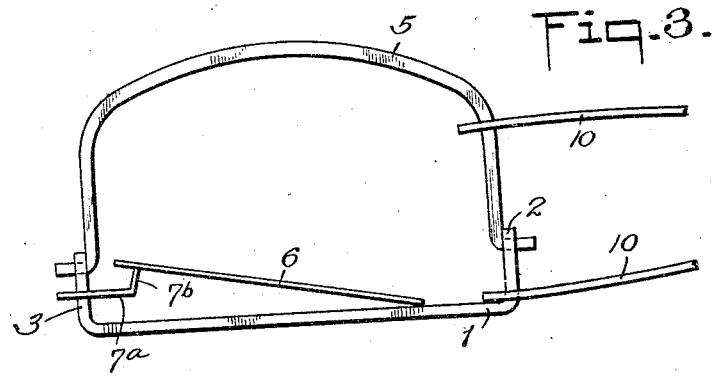
Figure 1:
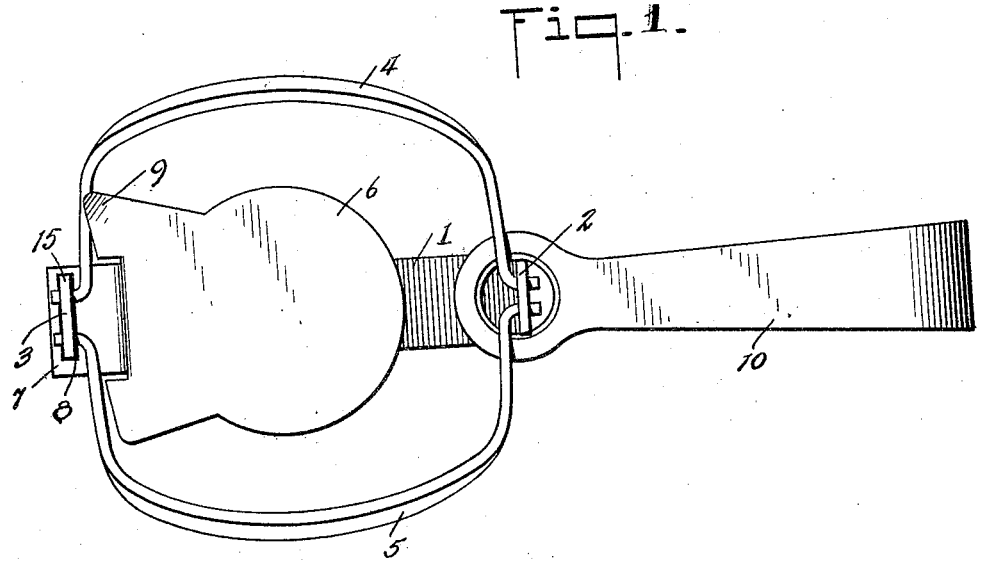

In the drawing:

Figures 1 and 2 represent respectively the plan and end view of a further modification, the trap being in set or open position; and Figure 3 represents an enlarged view of the construction shown in Figures 1 and 2, the trap being in closed or sprung position.

Referring to the drawings in which like references indicate like parts, the general form of trap comprises a base 1 having upturned ends 2 and 3, to which are pivoted in any usual manner jaw members 4 and 5. Between the jaws is a bait pan 6 having a tongue or projecting portion 7 which has an aperture 8 through which passes one of the upturned ends 3 of the base member 1. According to this arrangement, therefore, the bait pan is loosely pivoted upon the upturned end 3. The bait pan has an extension or ear 9 which is adapted to contact with one of the jaws 4 in order to hold it in the open position, the other jaw 5 being left free. By virtue of this arrangement in which the bait pan has a single ear or extension contacting with one of the jaws, an extremely sensitive setting can be obtained with the minimum of manipulation. The trap is actuated in the usual manner by means of the spring member 10 which is attached at the end of the base opposite that to which the bait pan is pivoted.

According to the construction illustrated in the drawing, the upturned end 3 of the base member 1 has a notch 12 on the side nearest the retaining lug 9 on the pan, and a shoulder 13 on the opposite side, as shown in Figure 2. The portion 7a of the bait pan tongue has a downward bend at an angle of approximately 10° with the plane of the main portion of the pan 6, as shown in Figure 3, for the purpose of holding the pan approximately level when in set position. It is understood that the value of the angle may be varied according to practice requirements.

The pan is placed in position by slipping the side of the aperture 8 nearest the member 9 into the notch 12 and giving the pan approximately a quarter turn over the upturned end of the base 3, until it contacts with the shoulder 13, the corner 14a of the upturned end of the base being rounded off in a curve of sufficient radius to make this possible.

In this arrangement, when the trap is in set position as shown in Figure 2, the pan extension or tongue 7 presses upwardly against the upper edge 15 of the notch 12 and downwardly against shoulder 13, which is of sufficient height to retain the pan in a substantially horizontal position.

The retaining lug or ear 9 may be upturned out of the plane of the pan 6 if desired, to insure a more sensitive setting.

It is understood from the foregoing that the constructions particularly described and illustrated in the drawing are given purely by way of example and that modifications may be made without departing from the spirit of the invention as set out in the appended claim.

We claim:

A spring actuated trap comprising a base having an upturned end, a pair of jaws, and a bait pan having an apertured portion through which said end passes, and a single extension on said bait pan which contacts with one of said jaws and holds it in set position, said upturned end being provided on the side nearer said extension with a notch, and on the opposite side with a shoulder, said shoulder being nearly the height of the upper edge of said notch, said shoulder and upper edge of said notch contacting with said apertured portion.

In testimony whereof we affix our signatures.

JOHN U. LEHN.
MARY A. HUEBENER.